United States Patent [19]

Dickson et al.

[11] Patent Number: 5,736,736
[45] Date of Patent: Apr. 7, 1998

[54] FLEXIBLE GUIDE ASSEMBLY FOR FACILITATING PLACEMENT OF AN ELONGATE PLASTIC INSERT WITHIN AN EXISTING PIPE

[75] Inventors: Dudley Trevor Dickson, Whitely Bay; Mohammed Yunis Aziz, Newcastle upon Tyne, both of Great Britain

[73] Assignee: British Gas plc, England

[21] Appl. No.: 427,079

[22] Filed: Apr. 21, 1995

[30] Foreign Application Priority Data

Feb. 23, 1995 [GB] United Kingdom ............... 95 03678

[51] Int. Cl.[6] .................................. G01B 11/26
[52] U.S. Cl. ..................... 250/227.11; 250/227.14; 356/241; 356/400; 405/184
[58] Field of Search ............... 250/227.11, 227.14; 356/241, 445, 400; 116/202; 405/184, 174, 175

[56] References Cited

U.S. PATENT DOCUMENTS

| | | |
|---|---|---|
| 3,637,314 | 1/1972 | Groot . |
| 4,020,641 | 5/1977 | Takada ............................ 405/184 |
| 4,199,258 | 4/1980 | Dau . |
| 4,978,850 | 12/1990 | Nakamura et al. ............... 250/227.11 |
| 5,219,345 | 6/1993 | Potter .............................. 250/227.11 |
| 5,331,152 | 7/1994 | Fenton ............................ 250/227.11 |
| 5,572,318 | 11/1996 | Hidaka ............................ 405/184 |

FOREIGN PATENT DOCUMENTS

| | | |
|---|---|---|
| 0 086 342 | 1/1983 | European Pat. Off. . |
| 0 194 882 | 3/1986 | European Pat. Off. . |
| 94/18540 | 8/1994 | WIPO . |

*Primary Examiner*—Stephone Allen
*Attorney, Agent, or Firm*—Larson and Taylor

[57] ABSTRACT

A sensor for use in installing a plastic service pipe inside a steel service pipe connected to a main includes a flexible element which is fed through the steel pipe and through the plastic pipe. The element has at its remote end two light-emitting diodes and two photoconductive cells. The flexible element and the pipe are fed together into the steel pipe. The sensor indicates when the cells have entered the main because the intensity of the light reflected to the cells falls to a low value and gives an audible or visual signal. This also indicates that the end of the plastic pipe which carries a seal is positioned correctly and that sealant can be injected into the space between the steel pipe and the plastic pipe. After the sealant has set the sensor can be recovered by withdrawal through the noise-piece and through the pipe.

17 Claims, 3 Drawing Sheets

FLEXIBLE GUIDE ASSEMBLY FOR FACILITATING PLACEMENT OF AN ELONGATE PLASTIC INSERT WITHIN AN EXISTING PIPE

FIELD OF THE INVENTION

The invention relates to sensors for installing pipes.

BACKGROUND OF THE INVENTION

The invention is applicable, for example, to the installation of gas feeder pipes, in particular to the installation of a plastic service pipe within an existing steel service pipe. The steel pipe is connected to a buried main at one end and is connected to a gas meter within a dwelling at the other end. In order to install the plastic service pipe, the meter is removed so that one end of the steel pipe is accessible within the dwelling. Then the plastic pipe is fed through the steel pipe (through the accessible end) towards the main. Once the plastic pipe has been fed far enough (for example as far as a T-connection between the steel pipe and the main) a fluid sealant may be injected into the space between the steel pipe and the plastic pipe.

SUMMARY OF THE INVENTION

It is an object of the invention to provide a sensor which will give an indication when the sensor (as it progresses along the steel pipe from the accessible end) reaches the main.

Thus, for example, if the sensor is fed into the steel pipe along with the plastic pipe, the sensor protruding from the remote end of the plastic pipe, the indication will also indicate that the remote end of the plastic pipe is correctly positioned adjacent to the main.

A sensor, for use in connection with the installing of a pipe according to the invention, comprises an elongate flexible member having a first end and a second end, a source of light at or adjacent said first end, a means sensitive to light at or adjacent said first end, said source and said means being connected to an electric circuit at or adjacent said second end, said electric circuit including a supply of energy for said source and said electric circuit responding to a change in intensity of light reaching said means.

Preferably, said source and said light sensitive means are positioned in a common plane extending transversely of the length of said elongate member.

Preferably, there are two sources and two light sensitive means, the two sources being spaced apart 180° about said length and the two means also being spaced apart 180° about said length but being spaced 90° from said sources.

For example, each source is a light-emitting diode.

For example, each means is a photoconductive cell.

BRIEF DESCRIPTION OF THE DRAWINGS

An embodiment of sensor will now be described by way of example with reference to the accompanying drawings, in which.

DETAILED DESCRIPTION OF THE PREFERRED EMBODIMENTS

Figure 1:
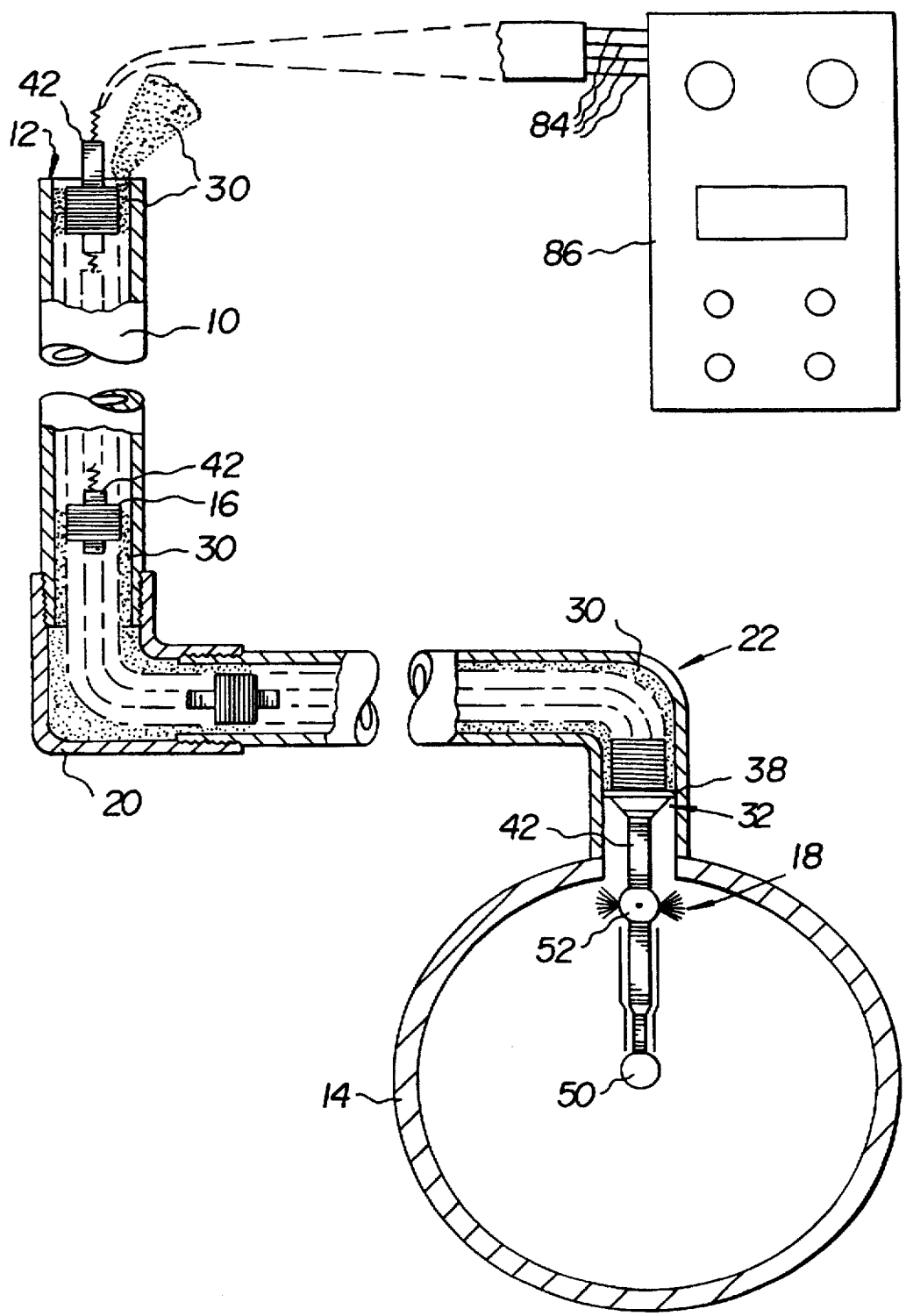
FIG. 1 is a vertical section through part of a steel service pipe and a buried main showing a plastic service pipe inserted through the steel service pipe and showing a sensor.

The plastic service pipe 16 having been inserted in the steel service pipe 10 far enough, the space between the steel pipe 10 and the plastic pipe 16 is filled with a fluid sealant 30, which is injected through the apparatus (not shown) and effectively through the accessible end 12.

When the fluid sealant 30 has set sufficiently, the sensor 18 is withdrawn through the nose-piece 32. The nose-piece 32 comprises an outer annular part 34 and an inner part 36 (see FIG. 2). The nose-piece carries an outer, annular seal 38 which engages the inner wall of the steel service pipe 10.

The nose-piece 32 prevents the sealant 30 from passing into the main 14 beyond the remote end of the plastic pipe 16.

The sensor 18 is also a flexible guide assembly which comprises a flexible guide element 42 which extends through the accessible end 12 of the steel service pipe 10, through the plastic pipe 16 and through the nose-piece 32. The plastic pipe 16 and the guide assembly are fed through the steel pipe 10 together. The flexible guide assembly assists in achieving negotiation of the sharp bends at 20 and 22 in the steel pipe 10. The protruding end portion of the flexible guide assembly, beyond the nose-piece 32, also acts to guide the plastic pipe 16 during its advance through the steel pipe 10. The flexible assembly includes two beads 50, 52.

When the flexible guide assembly is withdrawn, after the sealant 30 has set, the bead 52 encounters the inner annular part 36 (if the flexible guide assembly is slidable through the inner part 36). The inner part 36 is then displaced in a direction towards the accessible end 12 and allows the bead 52 to pass through the outer annular part 34 which is left behind in the steel pipe 10. Also, the plastic pipe 16 is now connected to the main 14 through the outer annular part 34.

Figure 2:
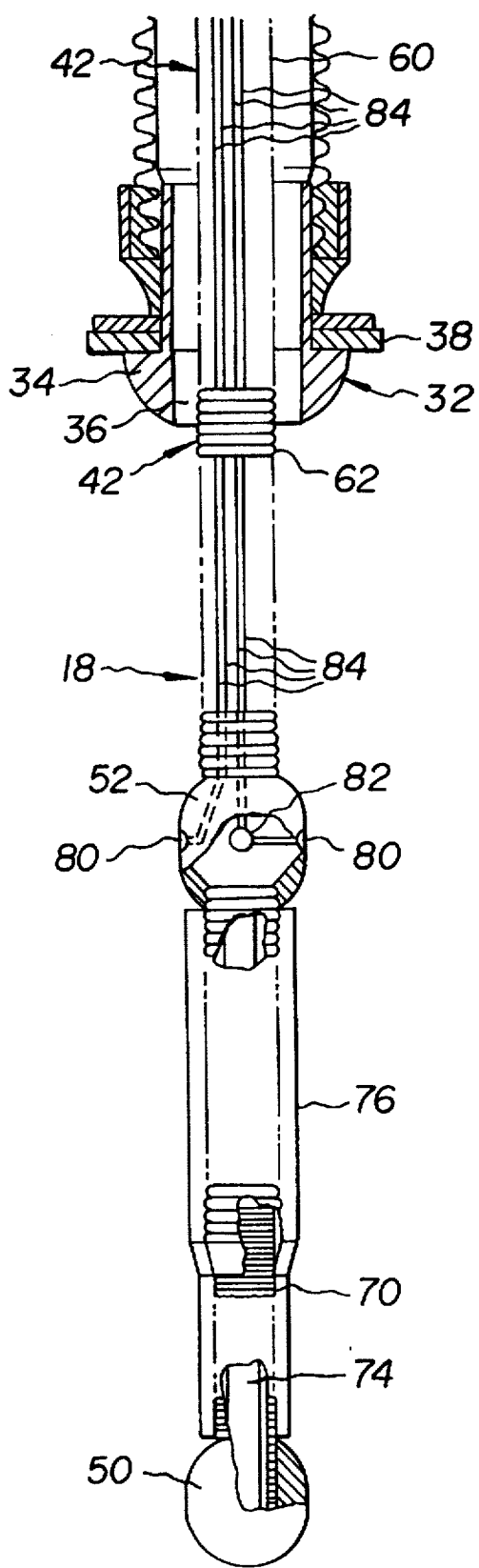
FIG. 2 is a vertical section through part of the plastic service pipe shown in FIG. 1 and through the sensor.

The preferred form of construction, however, is shown in FIG. 2. Here, the flexible assembly is connected to the inner part 36. The upper part 60 is connected to a first plug part (not shown) and the lower part 62 (the part protruding beyond the nose-piece 32) is connected to a second plug part (not shown). The plug parts are removably engaged and both are incorporated within the inner part 36 of the nose-piece 32. When it is desired to replace the part 62 the two plug parts are readily disconnected and a new part 62 is connected in place of the first. This is done, of course, while the flexible assembly is separated from the plastic pipe 16 and from the nose-piece 32. The plug parts are connected to electrical leads 84 (described below) which are shown for simplicity as being continuous within the inner part 36. In fact, the plug parts include male and female connectors to which the leads 84 are connected.

With this preferred form of construction (FIG. 2) withdrawal of the flexible guide assembly immediately displaces the inner part 36 from the outer annular part 34 of the nose-piece 32 and allows the bead 52 to pass upwardly through the outer part 34. Again, the plastic pipe 16 is connected to the main 14 through the outer annular part 34.

Below the bead 52, the flexible guide assembly includes a coiled wire spring 70 lying partly within the turns of the flexible guide element 42. The element 42 terminates in a frusto-conical ferrule 72. The assembly also includes a length of rubber 74 lying within the spring 70. The whole of the assembly between the beads 50 and 52 is encased on a braided plastic sheath 76. These features of the lower part of the assembly between the beads 50 and 52 are described for completeness only. They do not form part of the sensor.

The sensor 18 (FIG. 2) comprises the flexible guide element 42; two sources of light e.g. light-emitting diodes (LED's) 80 located in the bead 52; two means sensitive to light e,g, photoconductive cells 82, only one of which is shown in FIG. 2 located in the bead 52; electrical leads 84 connecting the LED's 80 and the cells 82 (located at or adjacent the lower end of the flexible guide element 42) to a combined power supply and signal processor 86 located at or adjacent the other, upper end of the flexible guide element 42. The processor 86 includes an electric circuit (FIG. 3 which includes a supply of electrical energy for the LED's 80 and which responds to a change in intensity of light reaching the cells 82.

The sensor 18, while the LED's 80 and the cells 82 are inside the steel pipe 10, does not give any indication. That is because the intensity of light reflected from the inner wall of the steel pipe 10 and sensed by the cells 82 is sufficient to keep the associated circuit in the non-alarm state. When the LED's 80 and the cells 82 enter the main the intensity of the reflected light sensed by the cells 82 falls to a very low value. The change is detected by the circuit shown in FIG. 3 and an alarm or other indication is given.

The LED's 80 and the cells 82 are positioned in a common plane extending transversely of the length of the elongate guide element 42. The LED's 80 are spaced apart 180° as are the cells 82, but are spaced 90° from each adjacent cell 82.

FIG. 1 shows a steel service pipe 10 which has an accessible upper end 12 and a lower end connected to a buried gas main 14. The lower end would, in most cases, be connected to a T-connector (not shown) which in turn is connected to the main 14. The accessible end 12 is normally connected to a gas meter (not shown) which has been removed. It will be appreciated that the accessible end 12 has apparatus (not shown) connected to it which enables the insertion of a plastic service pipe 16 and a sensor 18 without loss of gas (the main 14 is a live main and is full of gas at the pressure used by the distribution system e.g. 75 millibars).

FIG. 1 shows the plastic (e.g. polyethylene) service pipe 16 having been inserted through the accessible end 12 and fed through the steel service pipe 10 as far as the T-connector (not shown) between the steel service pipe 10 and the main 14. FIG. 1 also shows that the sharp bends presented by the elbow 20 and the T-connector at 22 have been successfully negotiated by the plastic service pipe 16 which has an internal liner 24 (see FIG. 2) also made of polyethylene.

Figure 3:
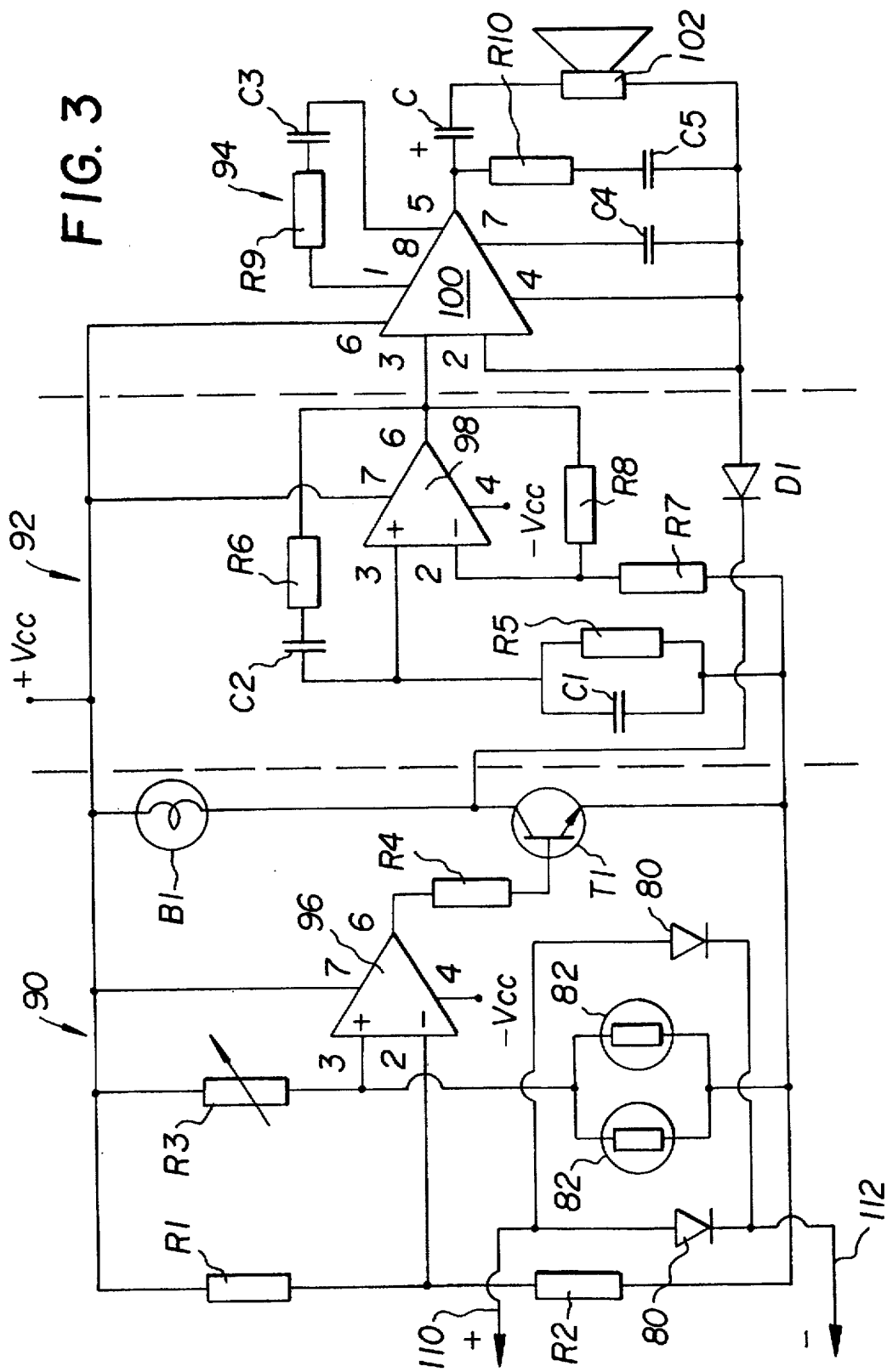
FIG. 3 is a circuit diagram of the sensor shown in FIGS. 1 and 2.

The circuit shown in FIG. 3 consists of three main stages, they are the sensor stage 90, the signal generator stage 92, and the audio power amplifier stage 94.

In the first stage 90 the voltage at the inverting input of the op-amp 96 is fixed by the potential divider R1 and R2 selected to make sure that a sufficient voltage drop is maintained at the inverting input of the op-amp 96 while the non-inverting input is connected to the junction of the photoconductive cells 82 (connected in parallel) and a potentiometer R3.

The potentiometer R3 is used to set the threshold for the cells 82 and to trigger the circuit at the desired level of light intensity. The op-amp 96 is operating as a single comparator to drive the transistor T1 ON or OFF depending on the light intensity picked by the cells 82. R4 is used to limit the current supplied to the base of the transistor T1.

Next is the signal generator stage 92 where the components R5, R6, C1 and C2 are used to determine the frequency of the audio signal, as follows:

$$f = 1/2\pi\sqrt{C_1 C_2 R_5 R_6}$$

Which reduces to:

$$f = 1/2\pi RC$$

When R=R5=R6 and C=C1=C2.

The resistors R7 and R8 are used to set the gain for the circuit of the op-amp 98 which is:

$$Av = (R8+R7)/R7$$

The gain (Av) must be at least a ratio of 3 in order to maintain the required audio signal.

In the audio amplifier stage 94 LM386N is a low voltage power amplifier, C4 is a bypass capacitor, and the combination of resistor R9 and capacitor C3 between pins 1 and 8 is chosen to adjust the gain of the amplifier 100 between 20 to 200. The components C5, C6 and R10 at the output of the audio amplifier 100 are used to provide the fixed voltage required to the (8-ohm) loud speaker 102.

The LED's 80 are connected in parallel to a driving circuit (not shown) by the leads 110, 112.

A bulb B1 is connected in series with the collector of the transistor T1. The bulb B1 is illuminated when the transistor conducts.

The components of the circuit shown in FIG. 3 have the following values:

| Component | Value |
| --- | --- |
| R1 | 10 kilo-ohms |
| R2 | 15 k-ohms |
| R3 | 100 k-ohms (variable) |
| R4 | 470 ohms |
| R5 | 100 ohms |
| R6 | 100 ohms |
| R7 | 150 ohms |
| R8 | 300 ohms |
| R9 | 1 k-ohms |
| R10 | 10 ohms |
| C1 | 0.1 micro-farads |
| C2 | 0.1 micro-farads |
| C3 | 10 micro-farads |
| C4 | 2 micro-farads |
| C5 | 0.05 micro-farads |
| C6 | 220 micro-farads |
| T1 | BFY 50 |
| B1 | (6 volt (40 milliampere |
| Speaker 102 | 8 ohms |
| Op-Amp 96 | 741 |
| Op-Amp 98 | 741 |
| Amplifier 100 | 386N |

We claim:

1. A sensor and probe assembly insertable into a pipeline for passage to a main pipe, said assembly comprising an elongate flexible member incorporating a source of light at a first end, light detector means for detecting the reflected light and detector circuit means for detecting when the assembly reaches the main pipe.

2. The assembly according to claim 1 wherein the detector circuit means is remote from the light source and said assembly further includes electric cable connections connecting said detector circuit means to said light source.

3. The assembly according to claim 1 including coupling means for detachably coupling a plastic insert thereto for lining the pipeline and allowing removal of the assembly thereafter.

4. The assembly according to claim 1 including a nose piece for preventing passage of sealant into the main pipe.

5. The assembly according to claim 1 wherein the light source comprises a light-emitting diode.

6. A sensor according to claim 1 wherein the light detector means comprises a photoconductive cell.

7. The assembly according to claim 1 wherein said light source and said light detector means are positioned in a common plane extending transversely of the length of said elongate flexible member.

8. The assembly according to claim 7 comprising two light sources and two detector means, the two light sources being spaced apart 180° about said length of the elongate member and the two detector means being spaced apart 180° about said length, the two detector means being spaced 90° from said light sources.

9. A flexible guide assembly for insertion of an elongate plastic insert within an existing pipe which pipe connects to a main pipe, the flexible guide assembly including an elongate flexible probe incorporating a light source and a light detector means for detecting when the flexible probe reaches the main pipe and coupling means for detachably coupling the plastic insert to the flexible probe for guiding insertion of the plastic insert in the existing pipe and for allowing the removal of the flexible guide assembly from the existing pipe thereafter.

10. The flexible guide assembly according to claim 9, further comprising indicator means remote from the probe to indicate to an operator at a remote end of the plastic insert that the main pipe has been reached.

11. The flexible guide assembly according to claim 9 wherein said light detector means detects change in intensity of light reflected in said existing pipe and said main pipe.

12. The flexible guide assembly according to claim 9 wherein the light source comprises a light-emitting diode.

13. The flexible guide assembly according to claim 9 wherein the light detector means comprises a photoconductive cell.

14. The flexible guide assembly according to claim 9 further comprising a nose piece associated with the plastic insert for preventing passage of sealant into the main pipe, said guide assembly being separable from said nose piece following the application of a sealant to the insert.

15. The flexible guide assembly according to claim 14 wherein said nose piece comprises outer and inner parts, said inner part being displaced from the outer part along with said flexible guide assembly during removal from the plastic insert.

16. The flexible guide assembly according to claim 9 wherein said light source and said light detector means are positioned in a common plane extending transversely of the length of said elongate flexible member.

17. The flexible guide assembly according to claim 16 comprising two light sources and two detector means, the two light sources being spaced apart 180° about said length of the elongate member and the two detector means being spaced apart 180° about said length, the two detector means being spaced 90° from said light sources.

* * * * *